United States Patent

[11] 3,601,888

[72] Inventors William E. Engeler
Scotia;
Marvin Garfinkel, Schenectady, both of, N.Y.

[21] Appl. No. 819,186
[22] Filed Apr. 25, 1969
[45] Patented Aug. 31, 1971
[73] Assignee General Electric Company

[54] SEMICONDUCTOR FABRICATION TECHNIQUE AND DEVICES FORMED THEREBY UTILIZING A DOPED METAL CONDUCTOR
16 Claims, 20 Drawing Figs.

[52] U.S. Cl. .......... 29/578, 29/590, 148/188
[51] Int. Cl. .......... B01j 17/00, H0115/00
[50] Field of Search .......... 29/578, 590; 148/188, 191

[56] References Cited
UNITED STATES PATENTS
2,817,607 12/1957 Jenny .......... 148/188
3,382,568 5/1968 Kuiper .......... 29/578
3,391,035 7/1968 Mackintosh .......... 148/189
3,502,517 3/1970 Sussmann .......... 148/175
3,511,724 5/1970 Ohta .......... 29/578

*Primary Examiner*—John F. Campbell
*Assistant Examiner*—W. Tupman
*Attorneys*—Paul A. Frank, John F. Ahern, Frank L. Neuhauser, Oscar B. Waddell and Joseph B. Forman

ABSTRACT: Semiconductor devices are produced by utilizing a metallic conductor having conductivity-type determining impurities therein and deposited at selected locations on a surface of the semiconductor body. The deposited metallic conductor not only provides good thermal, mechanical, and electrical contact to the surface of the semiconductor body, but in addition acts as an impurity source for a controlling step of diffusing the conductivity-type determining impurities into the semiconductor body. The semiconductor devices thus fabricated are characterized by having regions doped with conductivity-type determining impurities which are substantially coextensive with juxtaposed metal conductors having conductivity-type determining impurities therein.

INVENTORS:
WILLIAM E. ENGELER,
MARVIN GARFINKEL,
by John F. Ahern
THEIR ATTORNEY INVENTORS:
WILLIAM E. ENGELER,
MARVIN GARFINKEL,
by John F. Ahern
THEIR ATTORNEY INVENTORS:
WILLIAM E. ENGELER,
MARVIN GARFINKEL,
by John F. Ahern
THEIR ATTORNEY INVENTORS:
WILLIAM E. ENGELER,
MARVIN GARFINKEL,
by John F. Ahern
THEIR ATTORNEY

SEMICONDUCTOR FABRICATION TECHNIQUE AND DEVICES FORMED THEREBY UTILIZING A DOPED METAL CONDUCTOR

SEMICONDUCTOR FABRICATION TECHNIQUE AND DEVICES FORMED THEREBY UTILIZING A DOPED METAL CONDUCTOR

The present invention relates to the fabrication of semiconductor devices utilizing a novel diffusion method. More particularly, the invention relates to a diffusion method and devices formed thereby utilizing a deposited metal conductor as a diffusant source of conductivity-type determining impurities.

There are a number of techniques known in the semiconductor art which are utilized to provide a semiconductor with impurities so as to impart to it the proper conductivity value and type. Some such processes include crystal growth from an impurity doped melt and epitaxial crystal growth from an impurity containing vapor. Other techniques include solid state diffusion and alloying and recrystallization. Many such techniques are well known to those skilled in the art.

One technique particularly useful in planar semiconductor device fabrication advantageously employs a diffusion method of introducing an impurity into a selected region of the semiconductor material. For example, when it is desired to form regions of N-type conductivity characteristics using a donor impurity such as phosphorous in a surface adjacent portion of a P-type silicon wafer, the wafer with a patterned silicon oxide layer, for example, is heated for a suitable time, as for example one-half hour, at a suitable temperature, as for example 1000° C. A quantity of a donor, such as phosphorous pentoxide, for example, is maintained at a temperature of 250° C. in close proximity thereto. The $P_2O_5$ volatilizes and reacts with the exposed silicon wafer. The wafer then contains separate surface regions covered by silicon dioxide and doped with phosphorous respectively. The wafer is then heated in a "drive-in" step to approximately 1100° C. for 4 hours in an inert atmosphere, such as argon, to cause diffusion of the phosphorous into the wafer. A conventional photoresist technique cuts contact apertures through the $SiO_2$. At times, it may be necessary to utilize a second diffusion to improve contact resistance due to depletion of the impurity (phosphorous herein) during the drive-in step. A contact material is evaporated, patterned by a photoresist, and heated to bond the contact onto the silicon. This technique has the advantage over other prior art techniques of not requiring individual etching of each junction after its formation. Exceedingly fine patterns necessary for complex electronic circuits are readily obtained.

It would be highly beneficial to limit the number of steps heretofore necessary to fabricate semiconductor devices by diffusion techniques, yet maintain the quality produced. It would be further beneficial to utilize a technique which provides good thermal, mechanical, and electrical contact to the semiconductor material while also providing a source of appropriate conductivity-type determining impurities.

It is, therefore, an object of the present invention to provide a semiconductor device fabrication technique utilizing diffusion which reduces the number and complexity of process steps of prior art processes without any sacrifice of device quality or process advantages.

Still another object of the present invention is to provide a simplified, single diffusion step process for the production of semiconductor devices and circuits.

Another object of the present invention is to provide improved methods for forming ohmic contacts to semiconductor bodies.

Still another object of the present invention is the provision of improved self-registered semiconductor devices.

Another object of the present invention is to provide for a simplified device fabrication method utilizing diffusion which method permits construction of semiconductor devices having good thermal, mechanical, and electrical contact between a semiconductor body and a metal conductor which may function both as an electrode and a source of conductivity-type determining impurities.

Briefly stated, in accordance with one embodiment of our present invention, a metallic conductor doped with one or more conductivity-type determining activator impurities is deposited upon a preselected portion of a surface of a semiconductor body. As used herein, the term "metallic" is meant to include metals and metal alloys, but not to include metalloids, such as germanium, silicon and compound semiconductors. The activator impurities are diffused a predetermined distance into the semiconductor body, changing the electrical characteristics of the diffused region of the semiconductor. The metallic conductor serves as a diffusant source and, subsequently, as an electrode for the diffused region, hereafter called the conductivity modified region of the semiconductor body. Semiconductor devices which are fabricated in accordance with our present invention are characterized by having a metallic conductor with conductivity-type determining impurities therein juxtaposed over and which contacts the semiconductor in an area which is substantially coextensive with a region or regions within the semiconductor body doped with conductivity-type determining impurities.

The novel features believed characteristic of the present invention are set forth in the appended claims. The invention itself, together with further objects and advantages thereof, may be best understood with reference to the following detailed description taken in connection with the appended drawing in which:

Figure 4:
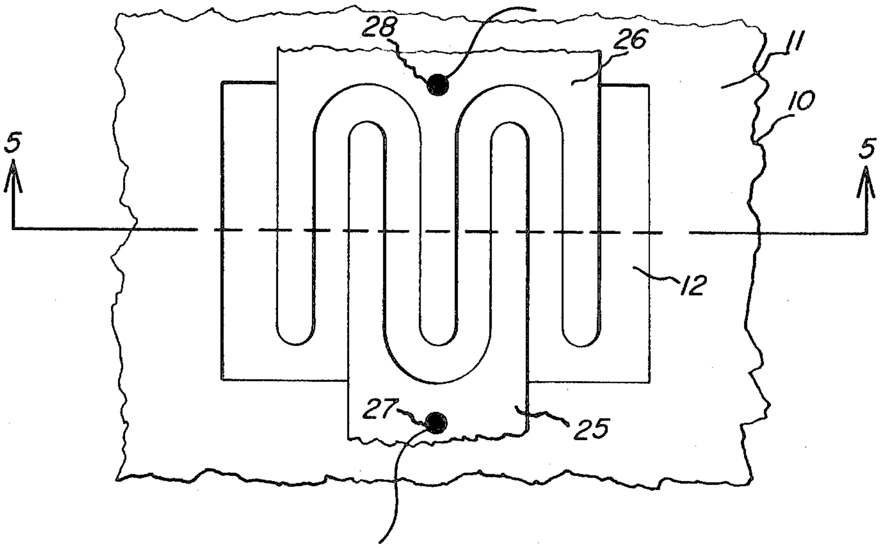
Figure 5:
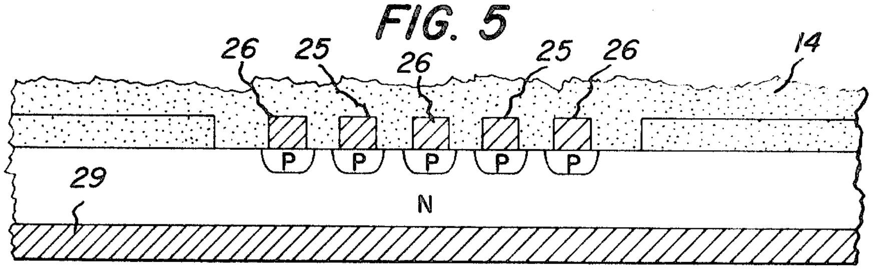
Figure 6:
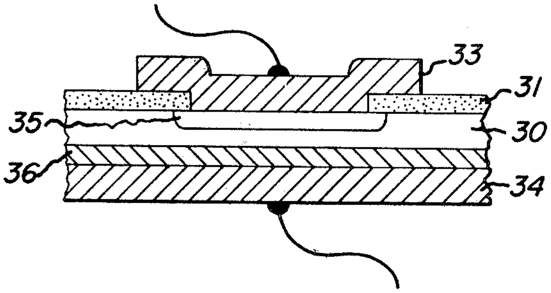
Figure 7:
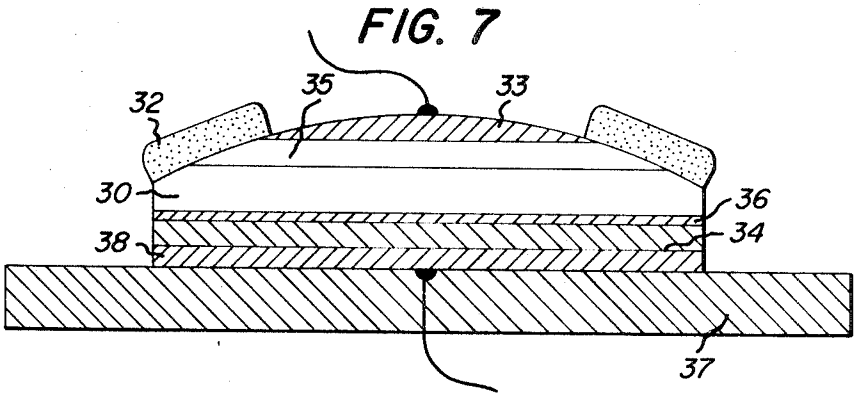
Figure 8:
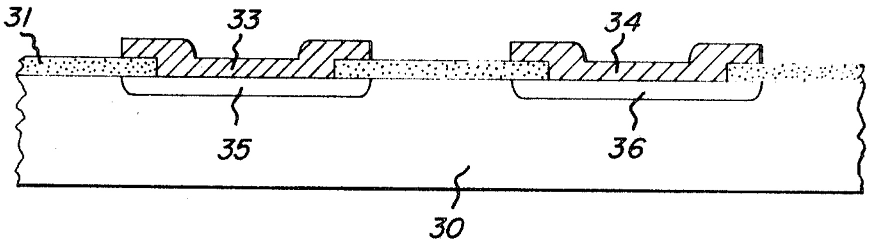
Figure 9:
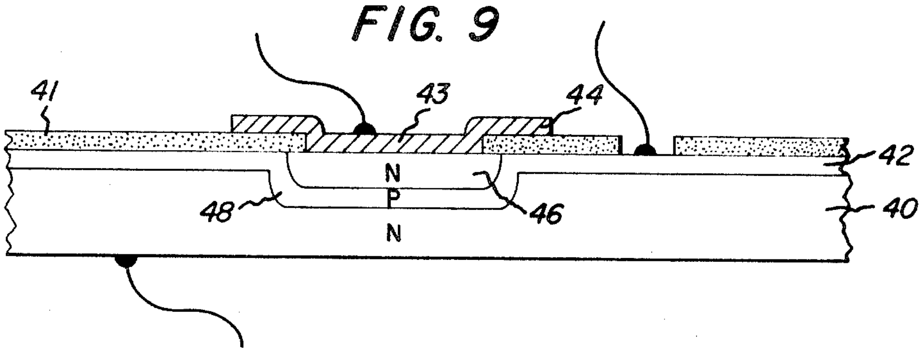
Figure 10:
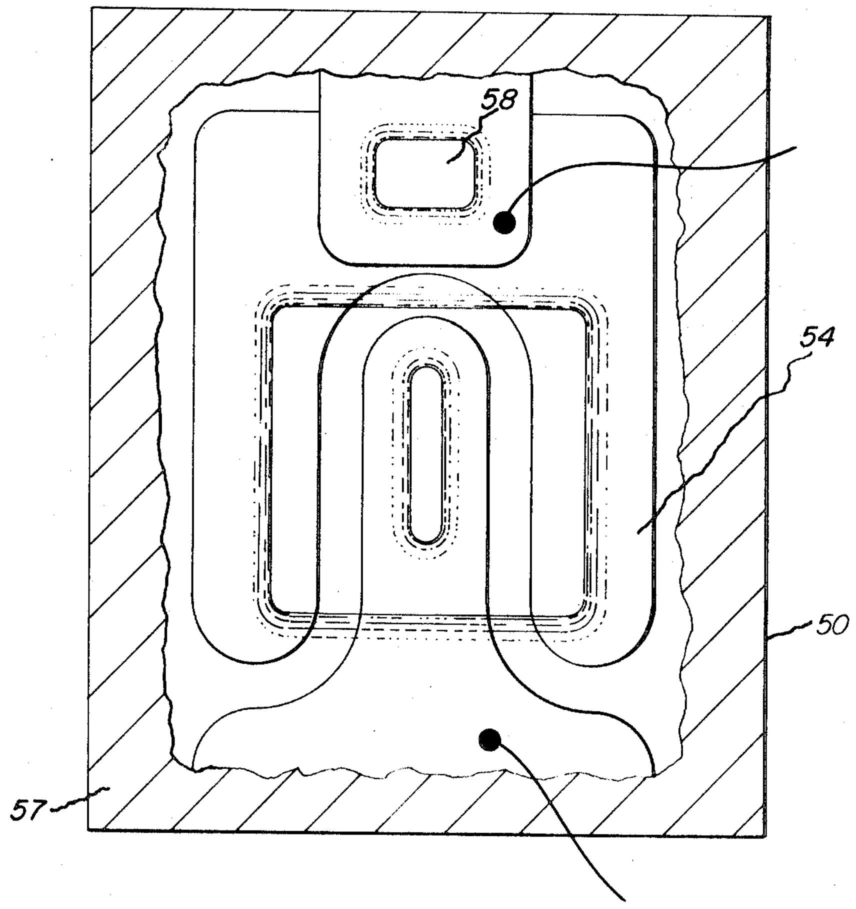
Figure 11:
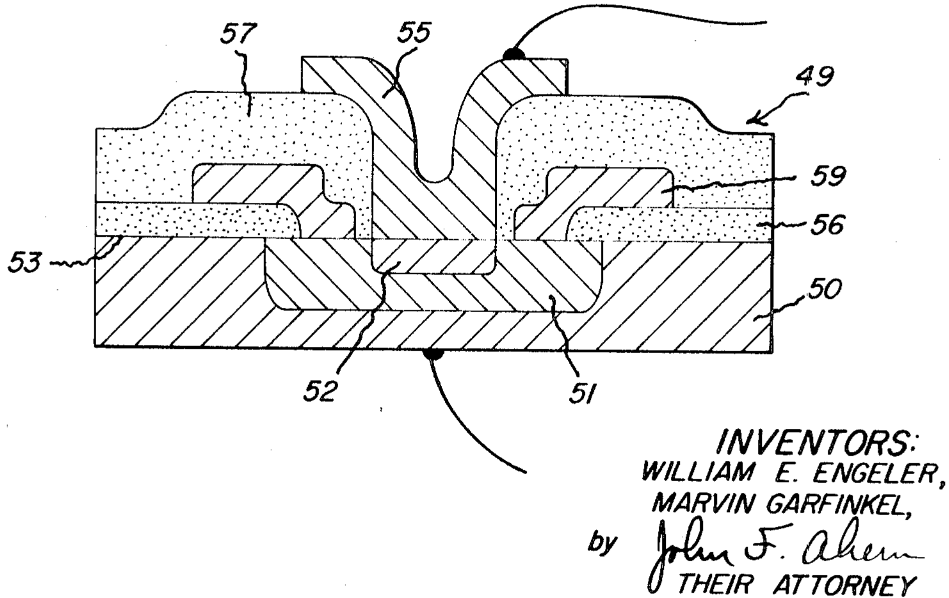

FIG. 4 is a horizontal plan view of a lateral bipolar transistor constructed in accordance with our present invention, FIG. 5 is a vertical cross-sectional view of a portion of the device of FIG. 4 taken along line 5—5, FIG. 6 is a vertical cross-sectional view of a portion of yet another embodiment of our invention, FIG. 7 is a vertical cross-sectional view of a high voltage rectifier constructed in accord with our invention, FIG. 8 is a cross-sectional view of a portion of an alternative embodiment of devices in accord with the present invention, and FIG. 9 is a vertical cross-sectional view of a portion of an NPN transistor formed by diffusion in accord with the present invention, FIGS. 10 and 11 illustrate different views of a bipolar transistor in accord with the invention.

We have found that a metallic conductor containing minor quantity of a conductivity-type determining dopant can be formed on a semiconductor wafer by suitable processes, as for example, sputtering from a sputtering source comprising a predetermined composition of metal and the dopant. The wafer may be then heated to diffuse the dopant into the semiconductor. The metal, which may act as an electrode, may be patterned in any desired configuration, providing great flexibility in device fabrication.

In accord with one expletive embodiment of our present invention, we provide for the fabrication of simple PN junction diodes by utilizing a metallic conductor having an appropriate concentration of the conductivity-type determining impurity therein. Initially, an insulating film, silicon dioxide, for example, is formed over a major surface of a semiconductor wafer, such as one of N-type silicon. The insulating layer, which may have a thickness between 1000 AU and 5000 AU, is patterned by conventional photoresist masking and etching techniques to expose selected portions of the underlying surface of the semiconductor material.

Utilizing triode sputtering techniques, for example, a metallic conductor is formed over the patterned region of the insulating layer and into the apertures in the insulating film, making contact with the exposed surface portions of the underlying semiconductor wafer. The cathode of the triode sputtering apparatus is a composite of a metallic conductor and impurity activator, and may be in the form of an alloy or fine grained mix.

It is desirable that the metallic conductor employed have a thermal expansion coefficient which approximates that of the semiconductor material and insulating layer substantially to preclude stresses forming when the structure is heated or cooled, thus ensuring good mechanical contact with the semiconductor surface. It is further desirable that the metallic conductor be of a high temperature refractory material so that it does not melt and/or form an alloy with the semiconductor to such an extent as to preclude controlled diffusion. Since in many fabrication sequences, etching of the metallic film of a closely juxtaposed insulating film, such as silicon dioxide occurs, in these instances a criterion for the choice of the metallic conductor is resistant to the effects of etchants utilized to etch insulating films. Similarly, in such instances, the metallic conductor should be susceptible to etching by etchants which do not adversely affect insulating films.

Throughout the description, for purposes of clarity, brevity and, for example only, molybdenum is described as the conductor metal. It should be understood, however, that other metallic materials such as tungsten, for example, may be utilized as well as may alloys of tungsten and molybdenum and metallic compounds and alloys having similar electrical conduction, refractory nature and etch resistance, and physical characteristics when commensurate with the requirements, as stated, and the results desired. Similarly, for brevity and ease of description silicon is described as the semiconductor utilized, although other semiconductors such as germanium, gallium arsenide etc., may be used.

Again, for simplicity of description, the impurity described herein is boron, although other activator impurities such as phosphorus may be used with silicon, while zinc or tin may be used with GaAs. Other impurities, both the usual acceptors and donors are suitable, depending upon the type of semiconductor desired and its subsequent application as is well known in the art.

The concentration of boron, for example, within the molybdenum, for example, alloy source depends upon the concentration desired within the selected region(s) of the semiconductor body, but for purposes of example, a PN junction may be formed in an N-type body of silicon when boron is introduced therein by diffusion from a molybdenum-boron alloy containing approximately 3 atomic weight percent of boron and bonded in intimate contact to the silicon body. In such an example, the layer of boron doped molybdenum is sputtered on a patterned portion of an insulating layer and may be between 700–10,000 AU in thickness. Other processes may, alternatively, be used, and sputtering is described in one example only. The pattern used may vary greatly, according to the end result desired. In one specific example, however, a series of circular apertures approximately 0.003 inch in diameter located on 0.020 inch centers may be utilized.

To provide for the diffusion of boron, for example into silicon, for example, a silicon body with an appropriate pattern of exposed silicon surface portions contacted with molybdenum-boron alloy, for example, is heated to temperatures of approximately 1100° C. in an inert atmosphere, causing the boron impurity atoms to diffuse into the region of the contacted silicon surface portions. As is well known to those skilled in the art, for diffusion at a predetermined temperature, the time interval of diffusion depends largely on the desired depth of the diffusion region. The depth of diffusion is approximately proportional to the square root of the time interval. These relationships also govern when a metal which reacts slightly or not at all with the semiconductor is used as a carrier for the diffusant. Typical diffusion times may range from minutes to weeks, depending on the impurity, the semiconductor and the temperature. For example, when boron is diffused into silicon at 1050° C., a P-type region approximately 1 micron deep is formed in approximately 3 hours.

At times, it may be desirable to provide the molybdenum conductor with a protective layer prior to the diffusion of the impurity into the silicon material to prevent oxides from forming on the molybdenum due to oxygen impurities which may reside in the inert atmosphere. The protective layer should comprise a material which does not significantly reduce the concentration of impurities available within the metallic conductor for subsequent diffusion. The protective layer should also be susceptible to a removal operation, subsequent to diffusion, when desired. For example, silicon dioxide which is easily removed, as for example, with "Buffered HF" is a suitable material for the protective layer.

When diffusion is completed, the metallic layer may be patterned by masking photoresist and etching techniques to form a plurality of discrete PN junction diodes. Alternatively the same objective may be achieved by forming a patterned metallic film prior to diffusion. Thus, as described, a simple but effective diffusion technique provides a source for diffusion of impurities into a region of a semiconductor. Additionally, when the surface concentration of activator diffused into the semiconductor is sufficiently high, i.e. in silicon, greater than $10^{19}$ atoms/cc. the metallic layer simultaneously provides a low impedance contact for the diffused conductivity-modified region. In general, this level of doping is attained to achieve the dual objective.

Figure 1:
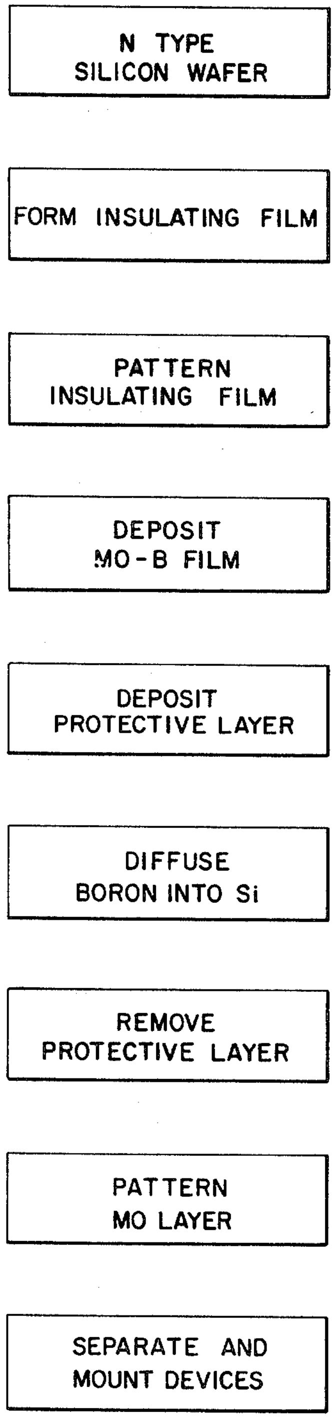
FIG. 1 is a flow chart describing the formation of simple PN junction diodes in accord with our present invention, FIGS. 2*a*–2*i* constitute a series of schematic illustrations of simple PN junction diodes in the process of fabrication, corresponding to the various steps of the flow diagram of FIG. 1.

One example of the formation of a plurality of PN diodes upon a single semiconductor wafer in accord with the present invention is illustrated schematically by the flow diagram of FIG. 1 and the corresponding schematic representations of FIGS. *2a–2i* which correspond to the successive steps of the flow diagram of FIG. 1 and illustrate, in vertical cross section, the successive conditions of a portion of a silicon semiconductor wafer being fabricated into PN junction diodes in accord with the present invention. Although the present invention may be practiced to form semiconductor devices from a number of semiconductors such as germanium, silicon, gallium arsenide, etc., the description details the use of silicon to facilitate brevity.

The foregoing general invention, for purposes of clarity of understanding, the invention will now be described with respect to certain embodiments thereof. An N-type silicon wafer 10, illustrated in FIGS. 1 and *2a*, may have dimensions of approximately 1 inch in diameter and a thickness of 0.010 inch, for example. Preferably, the silicon wafer is monocrystalline with a pair of major surfaces having crystallographic orientation which may, for example, be parallel with the <1,1,1> plane. To give an appropriate conductivity to the silicon wafer, a suitable donor impurity is incorporated therein. For example, a concentration of phosphorous of $6\times10^{15}$ atoms thereof per cc. of silicon is sufficient to produce an N-type wafer having a resistivity of approximately 1 ohm-centimeter. This wafer may be utilized as the substrate for the formation of semiconductor devices in accord with the invention. To accomplish this, the wafer is first provided with a patterned insulating film over one major surface thereof. This film is then used as a mask to allow selective contacting of the major surface portions by a metallic conductor film containing desired impurities suitable, for example, for the formation of PN junctions within the semiconductor wafer. To provide the thin film of insulating film 11 as illustrated by FIGS. 1 and 2b, a preferred technique is accomplished through dry oxidation of one major surface of the silicon wafer. Initially, the wafer is inserted into a reaction chamber while the wafer is heated to a temperature of, for example, 1000° C. to 1200° C. A suitable thickness for a silicon dioxide, thermally grown film is approximately 2000 AU. This is accomplished by maintaining the above conditions for approximately 2 hours.

Although the dry oxidation process described above is the preferred technique to form an insulating film, it is sometimes desirable to utilize another insulating material such as silicon nitride, for example. Silicon nitride has a greater resistance to the diffusion of conventional donor and acceptor atoms therethrough and thus, under some circumstances, provides a better mask. Silicon dioxide, on the other hand, is more readily etched to form apertures through which appropriate dopants may be diffused to form PN junctions (and source and drain regions when desired). At times it may be desired to use both types of films. When a silicon nitride film is desired, however, it may be formed by reacting $SiH_4$ and $NH_3$ at a temperature of 1000° C., at the surface of the uncoated or oxide-coated silicon wafer in the reaction chamber. This process may involve the use of a partial pressure of 0.015 tor of $SiH_4$ in an atmosphere of ammonia. A 1000 AU thick film of silicon nitride may be formed in approximately 10 minutes under these conditions.

A third technique utilizes a film of amorphous nature containing silicon, oxygen, and nitrogen, generally referred to as silicon oxynitride. Such a film is described in greater detail in the copending application of F. K. Heumann, Ser. No. 598,305, filed Dec. 1, 1966, and assigned to the same assignee as the present invention now abandoned. Briefly, the amorphous film may be formed, for example, by the pyrolytic reaction of silane, oxygen, and ammonia at the surface of a silicon wafer maintained at a temperature of approximately 1000° C. to 1200° C. As stated previously, the insulating film may comprise any combination of the films mentioned hereinbefore. Other films such as aluminum oxide, for example, may be sputtered upon the surface. Additionally, when low melting point semiconductors, as for example, germanium, are utilized, low temperature insulator forming processes should be used. Thus, for example, sputtering may be used, or, alternatively, low temperature oxidation of $SiH_4$ may be used to form a silicon dioxide film.

After the formation of insulating film 11 on silicon wafer 10, film 11, may in this embodiment, be patterned in a desired configuration as illustrated in FIG. 2*c*. Apertures 12 are formed by conventional masking photoresist and etching techniques, well known to those skilled in the art, exposing portions of the underlying surface of silicon wafer 10. For example, when insulating film is silicon dioxide or silicon oxynitride, the unmasked portion thereof may be readily removed by immersion in "Buffered HF" etchant, comprising 1 volumetric part concentrated HF and 10 volumetric parts of a 40-percent solution of $NH_4F$, which etchant etches silicon dioxide at a rate of approximately 1000 AU per minute. The etchant is utilized for the necessary time to remove the thickness of the silicon dioxide in the unmasked region. When silicon nitride is utilized alone, it is convenient to employ a concentrated hydrofluoric acid etchant (48 percent by volume) which removes the silicon nitride at a rate of approximately 130 to 150 AU per minute. Alternatively, an 85 percent solution of phosphoric acid at 180° C. may be employed to remove the silicon nitride at a rate of 60 to 100 AU per minute. This last alternative is preferred when insulating film 12 comprises $SiO_2$ and $Si_3N_4$. Combinations of various films may be removed by removing each film separately and washing the wafer prior to the next etch bath.

Following the patterning of film 11, a metallic conductor 13 is deposited over film 11 and apertures 12 therein. Deposition is preferably accomplished through triode sputtering which is known in the art, a description of which may be found in "Integrated Circuit Technology," by Seymor Schwartz, pp. 54–57 published by McGraw-Hill Book Company, New York 1967. Briefly, however, a filament is biased to −30 volts DC and is a source of electrons for the sputtering process. A composite source material such as an alloy or a fine grained pressed mix of molybdenum, for example, and an acceptor impurity, such as a 3 atom percent boron serves as a cathode and is, for example, biased to −3 kilovolts DC The entire process is conducted in an argon atmosphere having a pressure of, for example, approximately 5 microns. An electron beam moving under the influence of a small electric potential, as for example 30 volts, causes the argon atoms to be ionized into positive ions which are attracted to and bombard the composite electrode, biased, for example, to approximately −3000 volts. The silicon wafer with the patterned insulating layer is positioned adjacent the cathode and is heated to approximately 500° C. to facilitate good adherence of the boron doped molybdenum layer thereon. A layer approximately 4000 AU thick may be deposited on the wafer in about 5 to 7 minutes. A calibrated integrator in the circuit of the cathode source may be employed to ensure proper thickness.

The cathode source itself is, for example, made from a composite powder of molybdenum and approximately 3 atomic percent of boron. The composite powder is washed with a solvent such as isopropynol to remove any residual molybdenum oxide. The resulting slurry is allowed to set, resulting in separation of powder and is propynol. The liquid is poured off and the powder first dried and then pressed into disks which may have dimensions of approximately 1¼ in diameter and one-eighth inch thick.

When desired, the resulting disks may be sintered, i.e., heated in an atmosphere of argon, causing internal diffusion of the compressed powder. The disk may shrink in volume by 20 to 30 percent, increasing the density thereof and thereby strengthening the disk. Because high temperatures in the range of 2000° C. to 2100° C. are utilized to obtain a sintered disk, the impurities employed must not be highly volatile within the temperature range.

Alternatively, evaporation chemical deposition from a vapor, or other suitable deposition methods may be utilized in lieu of sputtering when desired. Whatever deposition process is utilized, the process is controlled, by means well known to those skilled in the art, to ensure the desired composition being deposited, and insuring the homogeniety thereof.

As stated hereinbefore, it may be desirable, before diffusion, to provide for a protective coating 14 over the metallic conductor film as illustrated in FIG. 2*e*. The argon or other inert atmosphere utilized when diffusing may contain small amounts of oxygen, which react with molybdenum, forming molybdenum oxide. To prevent oxidation, a thin layer of material, nonreactive to the molybdenum, as for example $SiO_2$ is formed on the surface of the molybdenum film. A film of silicon between 1000 to 1500 AU thick may be deposited through reactive diode sputtering. In reactive diode sputtering, a silicon source is utilized in an oxygen atmosphere. An alternative way of forming film 14 may be accomplished by heating the structure to 800° C. in the presence of a flow of ethyl othosilicate in argon, for example, to cause pyrolytic decomposition thereof, resulting in the growth of a $SiO_2$ film upon the molybdenum.

It may be desirable, however, to prevent the formation of a molybdenum oxide layer without the presence of a protective layer. This is done by assuring the purity of argon used during diffusion. This is accomplished by passing the argon used in diffusion through a chamber containing an oxygen getter, such as titanium chips, for example, heated to approximately 800° C. The residual oxygen in the argon combines with the titanium getter, leaving substantially pure argon to be utilized as the diffusion atmosphere.

FIG. 2*f* illustrates the condition of the wafer after the diffusion of the boron into the silicon wafer. Diffusion may easily be accomplished by heating the wafer to approximately 1050° C. for approximately 2 hours, resulting in a diffusion depth of about 1 micron of boron in the silicon wafer 10. Because diffusion depths are approximately proportional to the square root of the heating interval, greater depths may be obtained through longer periods of heating. The resulting diffusion produces regions 15 in silicon wafer 10, which regions exhibit P-type conductivity, as opposed to the N-type conductivity characteristics of the remaining portion of wafer 10.

FIG. 2*h* illustrates the condition of the semiconductor wafer and associated structure after patterning of the doped molybdenum conductor film 13, causing the formation of discrete PN junction diodes. Such photoresist and etching techniques are well known in the art, an example of which may be found in "Characteristics and Operation of MOS Field-Effect Devices" by Paul Richman, pp. 85–89, published by McGraw-Hill Book Company, New York, 1967. Briefly, however, conductor film 13 is covered by a photoresist material, and patterned as is described hereinbefore with respect to patterning of insulating film 11.

After developing, the wafer is heated at approximately 150° C. for approximately 1 hour in a nitrogen atmosphere, for example, to harden the film. The exposed portions of conductor film 13 are then subjected to an etch for molybdenum. Such an etch may comprise 380 cc. of ortho phosphoric acid, 30 cc. of acetic acid, 15 cc. nitric acid and 75 cc. of water. This etchant removes molybdenum at a rate of approximately 5000 AU per minute. The photoresist itself may be conveniently removed by a photoresist stripper such as, for example, "J—100" available from Indust-Ri-Chem Laboratory of Richardson, Texas.

The final steps of fabrication of PN junction diodes in accordance with our present invention results in devices as illustrated in FIG. 2*i* wherein contacts 16 and 17 have been attached. The wafer is scribed and discrete devices or groupings thereof are separated. Each module is then bonded to a suitable header 17 by alloying with a suitably doped gold solder 18, as with antimony in this instance. Contacts 16 may be formed by thermocompression bonding against film 13 portions. Alternatively gold may be coated over molybdenum members 13, as by evaporation and selective etching, or by selective electroless plating of the exposed metal. Next, thermocompression bonds are formed thereto to gain the advantage of the great ease of such bonding to gold, as opposed to molybdenum or similar metals. On the other hand, if integrated circuit modules are fabricated individual contact making steps are replaced by extending film portions 13 to form circuit interconnections.

Good electrical and mechanical contact is not only ensured through selection of a metal conductor with a thermal coefficient of expansion matching that of the semiconductor, but also results from substantially complete coverage by the metal conductor of the diffused region of the semiconductor exposed through the insulating layer. Thus, as illustrated in FIG.2*i*, a complete PN junction diode constructed in accordance with one embodiment of the method of our invention comprises a silicon wafer 10 of N-type conductivity having a major surface thereof covered by insulating layer 11 with apertures 12 therein. Metal conductor 13 with acceptor impurities, to induce P-type conductivity, cover a portion of insulating layer 11 including the apertures 12 therein. Because the doped metal was deposited over the apertured portion of insulating layer 11, substantially all of the surface of wafer 10 which was exposed through apertures 12 is contacted by metal conductor film 13. Since the size of apertures 12 may be large in comparison to the depth of diffusion of the acceptor impurities within semiconductor wafer 10, including lateral diffusion beneath insulating layer 11, substantially all of the conductivity-modified surface adjacent regions 15 exist beneath apertures 12 and, therefore, are "substantially coextensive" with the portions of metal conductor film 13 within apertures 12.

Figure 2:
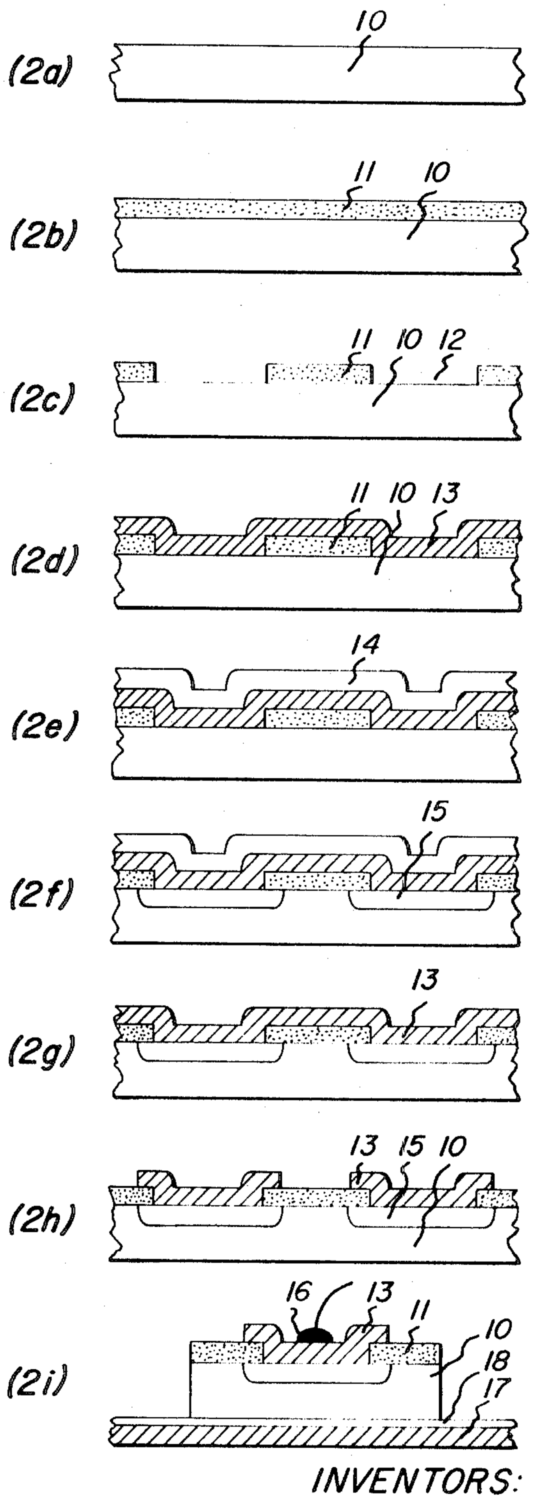

In the foregoing paragraphs, the devices described are of the type in which at least a portion of a conductive film containing conductivity modifying impurities activators is in contact with a surface adjacent conductivity-modified region of the semiconductor body and is substantially coextensive therewith, due to the fact that the conductivity modification occurred by diffusion of activators from the conductive strip. The substantial coextensive characteristic of the contact portion of the conductive film and the conductivity-modified surface adjacent region is a type of self-registration. In this type of self-registration, as described with respect to the device therein as, for example, in FIG. 2*i*, the entire surface adjacent conductivity-modified region is substantially coextensive with the conductive film portion which is allowed to contact the semiconductor. In the device of FIG. 2, the self-registration is also obtained by virtue of the fact that the conductive film extends through an aperture in an oxide film to contact an aperture-limited portion of the surface of the semiconductive wafer.

This concept of self-registration is, however, not limited to devices such as those illustrated in FIG. 2, wherein the extent of the substantially coextensive surface-adjacent conductivity-modified region is substantially specified in the step in the fabrication of the device which defines the insulator apertures. In other devices, such as that illustrated in FIG. 3 of the drawing, other important manipulative steps are utilized to cause the imparting to the device of new and unique characteristics not heretofore obtainable. Thus, for example, in the device of FIG. 3, a semiconductive wafer 10 has formed thereover a thin insulating film 11 which is apertured by the formation of a substantially rectangular aperture 12 therein. A conducting film of metallic conductor 13, containing a minor portion of an appropriate donor or acceptor activator, is then deposited over the entire wafer. The conducting film is then patterned, as for example, to form a plurality of parallel stripes 20 having a high density and fine resolution. The wafer may then be covered with an insulating layer, as for example, a thin film 1000 AU thick of silicon dioxide, formed as it is described hereinbefore and the entire device subjected to a sufficient temperature for diffusion, as for example 1050° C., for a sufficient time, as for example 4 hours, to form a surface adjacent region 15 of, for example, 1 micron in thickness, having conductivity characteristics generally opposite, but at least different from that of the main portion of body 10. Region 15 is caused by the diffusion of impurity activators from the unremoved portions of conductive film 13, the geometry thereof determining the lateral extent of diffusion, so that the conductivity-modified regions are substantially coextensive with the remaining strips. Typically, diffusion may be to a depth of approximately 1 micron.

After diffusion, a central portion 19 of the last-deposited insulator and of the conductive metal pattern may be removed, to form an aperture 19 exposing the conductivity-modified surface portions and unmodified intervening strips which constitute a high resultion, high density, matrix of resistive elements which are contacted at the periphery of aperture 19 at the end portions 22 of strips 20. This device, although modified from the complete self-registration of the devices illustrated in FIG. 2*i*, carries forward the self-registration concept and obtains great advantage therefrom, in that the portions of the film which are not removed and which serve as contact members for the individual resistive strips are self-registered with the resistive strips at the end portions 22 thereof.

Figure 3:
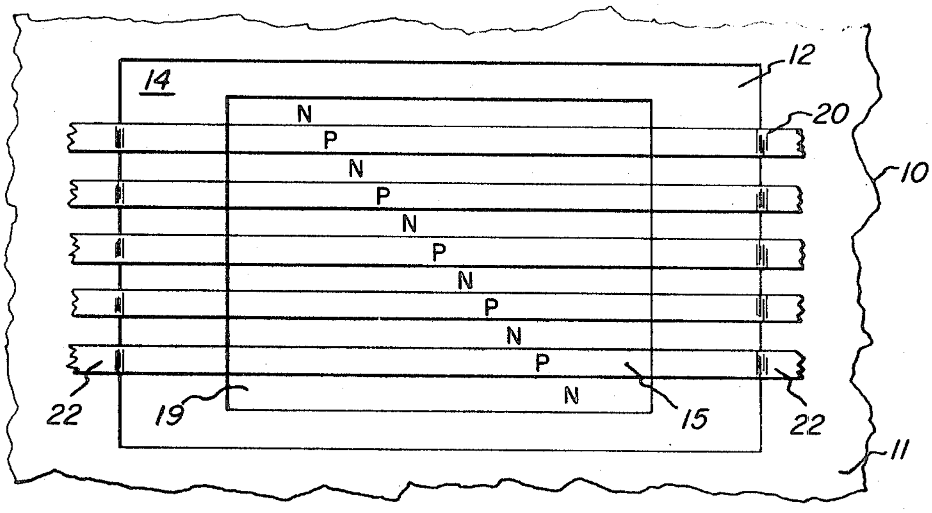
FIG. 3 is a horizontal plan view of an array of self-registered resistive elements on a semiconductor wafer formed in accordance with our present invention.

In yet another embodiment involving this concept, but yet, involving a further concept, a similar high density, high resolution, matrix of plural resistive strips or other similar devices which may have a pattern of parallel members, or members having any preselected configuration, as may the members of the device of FIG. 3 is formed by the deposition of the doped conducting film directly upon the surface of the semiconductive wafer. In this embodiment the metallic conductive film is patterned in any preselected pattern, as for example, in the hereinbefore described high density, parallel, stripe pattern or, for example, in a plurality of concentric "bullseye" patterns or any other desired pattern. The patterned conductive film portions remaining are then covered with a suitable insulating material, as for example, 3000 AU thick of silicon dioxide. After coating with insulator, the device is heated to a suitable temperature, as for example, 1050° C., for a suitable time, as for example, 4 hours, to cause diffusion of the included activator, typically boron or phosphorous, to a depth of approximately 1 micron, for example, into the semiconductive wafer, to cause the formation of surface-adjacent conductivity-modified regions having the identical shape and pattern of the patterned conductive metallic film. The device concept utilized in this embodiment may likewise be utilized in devices as illustrated in FIG. 2*i*. Thus, for example, rather than defining the pattern of the conductive film which contacts the surface of the semiconductor surface by a patterned insulator, the conducting film itself may be patterned, as herein.

In yet another embodiment of the invention the doped conductive film diffusion method of the invention may be used to form a new and highly efficient bipolar lateral transistor. Such a device is illustrated in FIG. 4 of the drawing. In FIG. 4, semiconductor substrate 10 conveniently N-type silicon, having a resistivity of approximately 1 ohm-cm. is first coated with a thin, as for example, 3000 AU thick film 11 of thermally grown silicon dioxide. As in prior embodiments, a substantial aperture 12, of say, 2 to 10 mils square, for example, is etched in insulating film 11. The coated wafer is then covered with a film 13 of a metallic conductor containing a minor quantity of a suitable acceptor activator, as for example, 3 atom percent of boron. The film is then patterned to form a pair of closely spaced, electrically isolated electrodes 25 and 26 each having an elongated periphery, as for example, an interdigitated pattern, as is illustrated in FIG. 4 wherein emitter electrode 25, having an emitter contact 27, and collector electrode 26, having a collector contact 28, are formed. After patterning film 13, the assembly is again coated with an insulating film 14, conveniently silicon dioxide, 3000 AU thick. The assembly is heated, as for example, to a temperature of 1050° C. for a time of, for example 30 minutes, to cause diffusion of boron into the silicon to a depth of, for example, 0.3 micron, approximately, forming P-type emitter regions with PN junctions between the P-type regions and the N-type base region of wafer 10. A base contact 29 is made to the lower surface of wafer 10. Unlike prior art lateral transistors, the surface adjacent conductivity-modified regions are coextensive with the contacts thereto and may be much smaller and have greater resolution than those fabricated by the oxide mask and "dig-down" techniques.

The foregoing embodiments are illustrative only of the many ways in which the present invention's self-registered concept may be utilized to form devices constructed in accord with the present invention wherein substantial coextensiveness between the diffusion source-electrical contact and the surface-adjacent conductivity-modified region is achieved in accord therewith. Many alternative type structures may be constructed and, utilizing the teachings of the present invention, such alternatives would be obvious to those skilled in the art.

It is important to note that the temperature range at which diffusion is conducted is significantly lower than the temperatures at which the metal conductors utilized herein alloy with the semiconductor. For example, molybdenum alloys with silicon at a temperature of approximately 1390° C. while as discussed hereinbefore, diffusion is conducted at lower temperatures as for example at approximately 1100° C.

While some traces of an intermetallic compound caused by a reaction between the metal and the semiconductor may form during diffusion, even at these low temperatures through a solid-state reaction without melting, we have found that this reaction is minimal and has no significant effect upon the characteristics of the PN junctions, as detailed hereinbefore. In this instance, a thin residual oxide layer of 10 AU or less which may be present on the exposed surface may inhibit the solid-state reaction, while permitting good electrical contact to the diffused regions through electron tunneling. Impurity atoms readily diffuse through such thin layers. Such thin oxide layers are naturally present on silicon wafers. In instances, with other semiconductors, where such films do not occur naturally, their formation may readily be accomplished in order to prevent undesired intermetallic compound formation between the semiconductor and the metallic conductor.

Our present invention may also be employed to diffuse selectively areas of a silicon wafer using metallic deposits doped with various dopants. We have found that in addition to providing improved means of forming PN junctions, that the present invention is ideally suited for the formation of improved nonrectifying or low impedance contacts.

FIG. 6 illustrates, in the final state, an N-type silicon wafer 30 having the major surface thereof covered by insulation layer 31. A metal conductor 33, such as molybdenum doped with an acceptor impurity, for example boron, has been deposited on insulating layer 31 over a region thereof having an aperture which exposes a portion of the underlying major surface of silicon wafer 30 and is diffused thereinto. A metal conductor 34 which may be molybdenum doped with a donor, which for silicon may be phosphorus for example, of such high concentration so as to provide at the surface of the semiconductor, a sufficient concentration, i.e. greater than $10^{19}$ atoms/cc. for silicon, and to form a sufficiently narrow surface barrier as to permit electron tunneling therethrough, and thus achieve a low impedance contact therebetween, is deposited over and the activator impurity diffused into wafer 30, on the opposite major face thereof. Thus, metal conductor 33 acts as one source of one-type impurity contacting one major surface while metal conductor 34 acts as a second source of an opposite-type impurity contacting the opposite major surface. The P-type diffused surface-adjacent region 35 provides a PN junction with silicon wafer 30, as before. Surface-adjacent region 36, being doped with donor impurity, however, forms a low impedance nonrectifying contact to wafer 30 which is also N-type, even though semiconductor wafer 30 may be of a high resistivity, to provide improved high voltage performance. Being heavily doped, region 36 makes a low impedance contact to metallic contact 39.

The steps including photoresist techniques necessary to fabricate the semiconductor device of FIG. 6 are essentially the same as those described in relation to FIGS. 1 and 2. Metal layer 34, may however, cover substantially the entire wafer and the insulator layer adjacent to it may be omitted. Because diffusion of regions 35 and 36 are advantageously done simultaneously, only an additional step of depositing a second doped metal conductor is necessary. Sequential diffusion, however, may be performed, when desired. The semiconductor devices constructed in this manner are again characterized by having the portions of metal conductor 33, within the aperture coextensive with surface-adjacent region 35.

Similarly, a high voltage, silicon, for example, rectifier may be fabricated in a manner similar to that of the device of FIG. 6, except that both metal layers 33 and 34 cover substantially all of the respective major surfaces of the wafer. Following diffusion, the peripheral portion of the surface of the wafer having metal layer 33 thereon is beveled as is commonly done to reduce the surface electric field strength so as to permit high voltage operation. This exposes the junction but the exposed portion of the junction may later be covered by an insulating layer such as a room temperature atmospheric moisture vaporized polyorgano-siloxane rubber elastomer such as that obtainable from General Electric Company, Waterford, New York and identified as RTV.

In this embodiment of the invention, neither photoresist steps nor insulators capable of withstanding diffusion temperatures are necessary. Such a device is illustrated in FIG. 7, wherein like legends identify like parts to FIG. 6. In FIG. 7 elastomer 32 seals diffused region 35 and its PN junction. The device of FIG. 7 is secured to a heat removal header or base 37 by means of metallic layer 38.

Similarly, complex integrated circuits may be fabricated utilizing the present invention by forming both P and N diffused regions on the same surface of a given wafer. In this instance a first film of activator doped molybdenum, for example, is deposited onto the wafer and patterned. A second film of molybdenum, for example, doped with a donor impurity may then be deposited and patterned. These metallic film portions may then serve the multiple roles of providing N- and P-type conductivity-modified regions within the portions of the wafer adjacent different portions of the same surface, and simultaneously, to serve to contact these regions with good mechanical and electrical contact. Portions of these films which are electrically isolated from the substrate may also be utilized to interconnect various regions, as desired.

Such a device is illustrated in FIG. 8 wherein like numerals refer to like parts. In FIG. 8, regions 35 and 36 are conductivity-modified P- and N-type regions, respectively, diffused from separately formed metallic conductive film portions 33 and 34.

Our present invention may be utilized in constructing semiconductor devices having NPN and PNP configurations or any combinations thereof. For example, in practicing our present invention, we may diffuse a high concentration of a one conductivity inducing activator from a doped metallic conductor into a previously opposite conductivity-type diffused region to form a doubly diffused planar transistor. In yet another embodiment, our invention may be utilized to form a transistor by simultaneous diffusion of both donors and acceptors from the same metallic conductor in a similar configuration to that disclosed in our copending application Ser. No. 760,526, filed Sept. 18, 1968, and assigned to the same assignee as the present invention.

Briefly, as is more particularly described therein, a doped layer of semiconductor material is formed upon one surface of a more lightly doped substrate of semiconductor material. An insulating layer is then formed on top of the doped layer of semiconductor material. A hole is then etched through the insulating layer and the doped semiconductor layer by conventional photoresist and etching techniques. In accordance with the present invention a metallic conductor containing a predetermined concentration of both donor and acceptor impurities is formed in the etched hole. The concentration of the impurities is predetermined with the impurity of the conductivity-type which is the same as that of the semiconductor layer and substrate being faster diffusing and in lower concentration than the impurity of the opposite conductivity type during the subsequent diffusion step. The entire assembly is then heated to cause diffusion of impurities to predetermined depths into the semiconductor body. The faster diffusing impurity penetrates to a greater depth than the other impurity, forming a narrow doped region of one conductivity-type below a more heavily doped region of the opposite conductivity type in the semiconductor body. In this manner an NPN or PN structure is formed adjacent the hole. Such a structure is illustrated in FIG. 9. In FIG. 9, N-type silicon wafer 40 has a heavily doped layer 42 at the surface thereof. Metallic conductor layer 44 containing both boron and antimony is deposited in hole 43 through insulator layer 41 and doped layer 42. During diffusion both N-type emitter region 46 and P-type base region 48 are formed beneath conductor 44. Layer 42 forms a base contact and metallic conductor 44 constitutes an emitter contact. Wafer 40 is the collector. By reversing the conductivity types and using suitable fast diffusing donors and slow diffusing acceptors, a PNP transistor may be formed.

FIGS. 10 and 11 illustrate modified plan and vertical cross-sectional views respectively of a bipolar transistor 49 made using both of two basic diffusion techniques of the invention. In FIGS. 10 and 11 a wafer 50 of N-type silicon has a first diffused base region 51 formed by diffusion from a patterned conductive metallic film deposited directly on a portion of the surface of the wafer. A second diffused emitter region 52 is formed within base region 51 by patterning an overlying oxide film 57 and depositing the metallic conductor therein to form the pattern. The main body of the wafer 50 serves as collector. In FIG. 10, the central portion of silicon dioxide film 57 is broken away to reveal parts thereunder.

Transistor 49 is made by first thermally growing an oxide film 56 over the active major surface 53 of wafer 50. A central aperture is etched therein and filled with a film portion of boron doped molybdenum. The boron is diffused to form base region 51. The molybdenum is then removed from the wafer by etching except for that portion 59 covering the Ω-shaped base contact area 54 in FIG. 10. A second thin film 57 of silicon dioxide is deposited on the entire wafer and apertured centrally between the legs of the base omega leaving lateral insulation therefor, and defining a pattern for an emitter region. Simultaneously an aperture 58 is etched for making contact to molybdenum base electrode 54.

A phosphorous doped molybdenum film 55 is deposited within the aperture in the silicon dioxide film at the emitter region. The device is heated and the emitter 52 is diffused into the base. Contacts are made to collector, base contact 59 and emitter contact 55.

The device above is characterized by exceedingly small size, due to self-registration of emitter and its contact. This provides a finely interdigitated structure which is necessary for high power, high frequency devices.

In general, it is noted that the devices described herein are only examples of the application of the present invention. For example, it is noted that the terms "planar" and "substantially planar" as used in the description and claims are applied, in accord with the terminology used in the art, to devices and circuits prepared by diffusion of impurities into or epitaxial deposit of thin layers on to a semiconductive wafer having a substantially planar surface. The minor variations introduced by epitaxy or by conversion to an oxide and removal of same in selected regions actually produce a variation of only a fraction of a micron in a device having other dimensions of many microns and are thus not significant. Furthermore, it is intended that this invention include those devices or circuits which include diffusion into two substantially parallel surfaces of a single wafer.

In the foregoing disclosure we have described a novel and advantageous method of fabricating different classes of semiconductor devices by depositing a metallic conductor doped with preselected concentrations of activator impurities on appropriate locations of semiconductor material. The metal conductor not only provides good thermal, mechanical contact with the semiconductor material and to leads which may be bonded thereto, but also acts as a source of diffusant when the subsequent step of diffusing impurities takes place. Because the metal conductor may function as both a diffusant source to a region selected for diffusion and an electrode, the semiconductor devices fabricated in accordance with our present invention are characterized by having substantially all of the conductivity-modified surface-adjacent region substantially coextensive with a metal contact which is doped with conductivity-type determining impurities. The devices, therefore, are advantageous in that the entire major surface portion of the semiconductor body through which diffusion takes place is contacted by the doped metal conductor. Good electrical contact is thus afforded to the surface-adjacent regions. By selection of an appropriate metal for the metal conductor stable thermal and mechanical contact is also ensured. Other semiconductor devices may be fabricated by depositing the doped metal conductor on an insulating layer, and diffusing the impurities into regions on the underlying semiconductor body, forming surface-adjacent regions coextensive to the semiconductor surface through which impurities diffused. AS is disclosed hereinbefore, devices in accord with the present invention include PN junction diode, bipolar transistors, high voltage rectifiers, and resistive elements. Other devices may, however, be made in accord with this invention with advantage. Some such other devices are strain gauges, field effect transistors and tunnel diodes.

While the method and characteristic devices fabricated thereby of our present invention have been described herein in relation to the construction of certain specific semiconductor devices performing specific functions, it would be obvious to those skilled in the art that other and different semiconductor devices having the characteristics detailed hereinbefore may also be fabricated by practicing the method of our present invention as described. It is also apparent that many modifications and changes will occur to those skilled in the art. Accordingly, we intend, by the appended claims to cover all such modifications and changes as fall within the true spirit of the present invention and claims.

What we claim is new and desire to secure by Letters Patent of the United States is:

1. A simplified method of diffusing a conductivity-modifying impurity activator into a surface-adjacent region of a semiconductor body having a substantially planar active surface and making electrical contact thereto which method comprises:

a. depositing over a substantially planar active major surface portion of said semiconductor body a layer of a metallic conductor having as a major constituent a high temperature refractory metal which does not melt or form an alloy with said semiconductor at activator diffusion temperatures and containing a minor portion of a preselected impurity activator therefor; and b. heating said body for a preselected time at a preselected temperature sufficient to cause said impurity activator to diffuse into said surface-adjacent region of said semiconductor body so as to modify the conduction characteristics thereof and make good electrical contact between said surface-adjacent region and said metallic conductor.

2. The method of claim 1 wherein said activator impurity is diffused from said metallic conductor into said semiconductor surface-adjacent region in a preselected pattern.

3. The method of claim 2 wherein said pattern is formed by forming a film of insulating material over the surface of said semiconductor body, removing portions of said insulating film corresponding to said pattern, and depositing said metallic conductor thereover so as to cause said metallic conductor to contact said major active surface only in said pattern, said insulating film being of sufficient thickness to serve as a diffusion mask for said activator impurity.

4. The method of claim 2 wherein said metallic conductor is deposited directly upon an exposed portion of said active major surface and portions thereof are removed to form said pattern.

5. The method of claim 4 wherein said patterned metallic conductor and said semiconductor body are covered with a stabilizing insulating film prior to diffusion of said activator impurity.

6. The method of claim 3 wherein after diffusion said metallic conductor is selectively partially removed in a second predetermined pattern so as to produce a module wherein selected regions of said metallic conductor remain in electrical contact with at least one of said conductivity-modified surface-adjacent regions of said semiconductor and are electrically isolated from preselected others of said conductivity-modified surface-adjacent regions of said semiconductor body.

7. The method of claim 4 wherein after diffusion a second pattern is formed from said previously patterned metallic conductor member by selective removal of predetermined portions of the previously patterned metallic conductor.

8. The method of claim 1 wherein first and second conductivity modified activator impurities are simultaneously diffused into said active major surface portion of said semiconductor body.

9. The method of claim 8 wherein said first and second activator impurities are present within the same metallic conductor and are diffused into the same active major surface portion:

a. said first activator impurity having a higher diffusion coefficient than said second activator impurity so as to diffuse more deeply into said semiconductory body and form an asymmetrically conductive junction with the surface-adjacent region of said semiconductor the electrical characteristics of which are dominated by said second slower diffusing activator impurity.

10. The method of claim 9 wherein said semiconductor is selected from the group consisting of germanium and silicon, said metallic conductor is selected from the group consisting of tungsten and molybdenum, and said first and second activator impurities are selected from the group consisting of antimony, phosphors, arsenic, bismuth, aluminum, boron, gallium, and indium.

11. The method of claim 8 wherein said first and second activator impurities are present in different metallic conductor portions and diffuse into different active major surface portions to form different conductivity modified surface-adjacent regions of said semiconductor body.

12. The method of claim 1 wherein said metallic conductor is selected from the group consisting of molybdenum and tungsten.

13. The method of making a low impedance contact to a portion of a semiconductor body having a first concentration of a conductivity-modifying impurity:

a. depositing in contact with a surface portion of said portion of said semiconductor body a metallic conductor having a major constituent which does not melt or form an alloy with said semiconductor at activator diffusion temperatures and having as a minor constituent an impurity activator of said one conductivity type, and heating said body to cause said impurity activator in said metallic conductor to diffuse into said portion of said semiconductor body to enhance the concentration of said one conductivity type inducing activatory impurity in a surface-adjacent region with which said metallic inductor is in electrical contact.

14. The method of claim 9 wherein said asymmetrically conductive function is a PN junction.

15. The method of claim 12 in which said enhanced concentration of one conductivity type activator impurity exceeds $10^{19}$ per cubic centimeter of semiconductor and said semiconductor is silicon.

16. The method of claim 1 wherein said said diffusion is carried out at a temperature of greater than 1000° C. and said semiconductor is silicon.